United States Patent

[11] 3,602,049

| [72] | Inventor | William C. Albert |
| | | Waldwick, N.J. |
| [21] | Appl. No. | 735,260 |
| [22] | Filed | June 7, 1968 |
| [45] | Patented | Aug. 31, 1971 |
| [73] | Assignee | Singer-General Precision, Inc. |
| | | Little Falls, N.J. |

[54] FLUID ACCELEROMETER
8 Claims, 4 Drawing Figs.

[52] U.S. Cl. .................................................. 73/503,
73/516, 200/61.47, 200/61.53
[51] Int. Cl. .................................................... G01p 7/00,
G01p 15/02
[50] Field of Search .......................................... 73/516,
517, 503; 200/61.45, 47, 53

[56] References Cited
UNITED STATES PATENTS

| 2,938,390 | 5/1960 | McFee .......................... | 73/516 |
| 2,943,493 | 7/1960 | Ten Bosch et al. ........... | 73/503 |
| 2,973,647 | 3/1961 | Smith et al. .................... | 73/503 |
| 2,997,883 | 8/1961 | Wilkes............................ | 73/503 |
| 3,008,334 | 11/1961 | Lees................................ | 73/516 |
| 3,164,997 | 1/1965 | Aske ............................... | 73/516 |
| 3,104,552 | 9/1963 | Bouchard....................... | 73/497 |
| 3,267,740 | 8/1966 | Stedman......................... | 73/497 |

*Primary Examiner*—James J. Gill
*Assistant Examiner*—Herbert Goldstein
*Attorneys*—S. A. Giarratana, G. B. Oujevolk and S. M. Bender ABSTRACT: A fluid accelerometer in which a proofmass assembly containing a volume of inert gas is disposed in a passage containing a damping fluid, and translates in the passage in response to acceleration.

INVENTOR
WILLIAM C. ALBERT

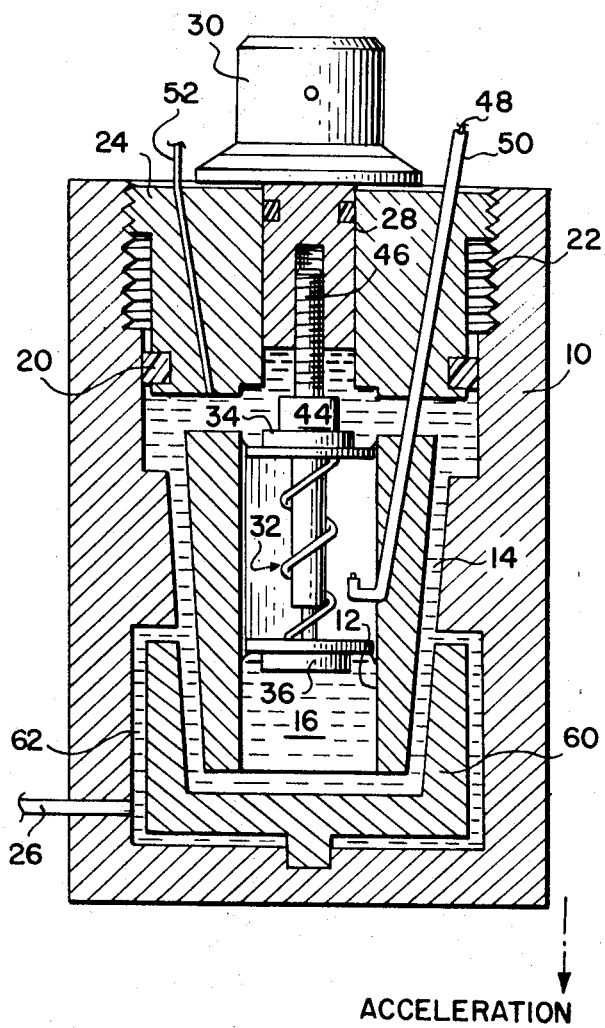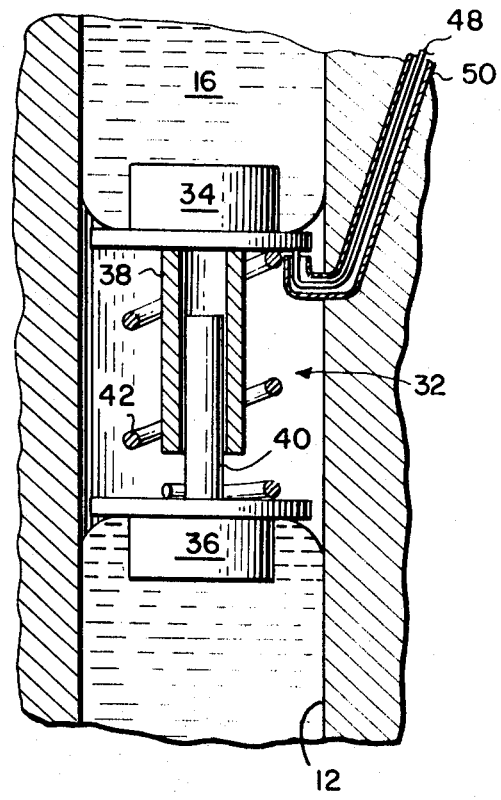
Fig. 4.
Fig. 3.
ACCELERATION
INVENTOR
WILLIAM C. ALBERT

FLUID ACCELEROMETER

BACKGROUND OF THE INVENTION

This invention relates to a fluid accelerometer and, more particularly, to such an accelerometer which can be mounted on a vehicle, or the like, for detecting the time integral of vehicle acceleration, which is vehicle velocity. Specifically the present invention relates to an accelerometer of the type wherein the motion of the proofmass is constantly damped by a dense liquid metal such that the displacement of the proofmass is proportional to the instantaneous velocity of the instrument itself. Variably adjustable means are provided cooperating with an electrical contact means to produce an output signal indicating that a predetermined velocity has been achieved. The accelerometer of the present invention also includes means for maintaining the damping on the proofmass assembly virtually constant despite wide changes in ambient temperature.

It is generally known to provide fluid accelerometers to sense the time integral of acceleration. However, these accelerometers or velocimeters as they are sometimes referred to normally utilize a solid proofmass which is floated in a fluid contained in a housing and which is of a higher density than the fluid, so that, upon acceleration of the housing, the solid proofmass translates in a direction opposite to that of the acceleration. However, these arrangements suffer from high cost and are somewhat complex in construction and operation.

It is, therefore, an object of the present invention to provide a fluid accelerometer which is simple in construction and operation, and which may be manufactured at a relatively low cost.

Briefly summarized, the fluid accelerometer of the present invention comprises a housing having an endless passage formed therein and containing a liquid metal such as mercury. A proofmass assembly containing an inert gas is disposed in the liquid metal so that, upon acceleration of the housing, a translation of the proofmass assembly relative to the housing will occur in the direction of acceleration. The magnitude of this translation is a measure of the vehicle velocity.

BRIEF DESCRIPTION OF THE DRAWINGS

Reference is now made to the accompanying drawings for a better understanding of the nature and objects of the accelerometer of the present invention, which drawings illustrate the best mode presently contemplated for carrying out the objects of the invention and its principles, and are not to be construed as restrictions or limitations on its scope. In the drawings:

FIG. 3 is a partial expanded view similar to FIG. 1, but showing the proofmass assembly in a contact-closing position; and FIG. 4 is a view similar to FIG. 1, but showing another embodiment of the present invention.

DESCRIPTION OF THE PREFERRED EMBODIMENTS

Figure 1:
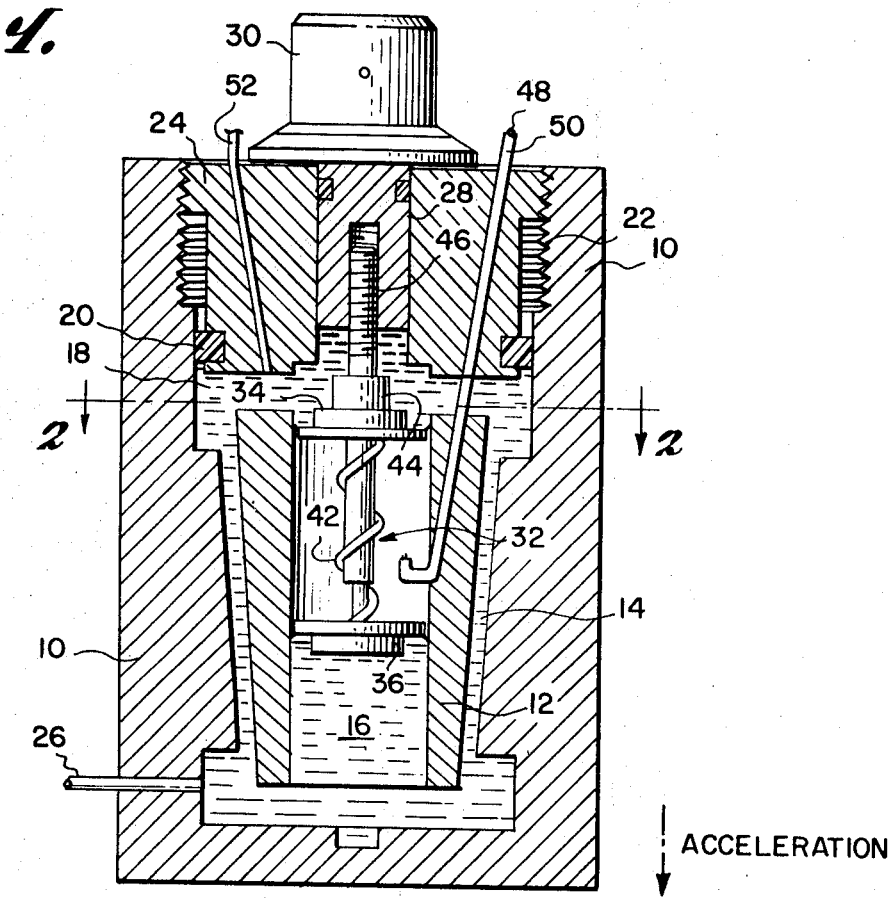
FIG. 1 is a partial cross-sectional view showing the accelerometer of the present invention.
Figure 2:
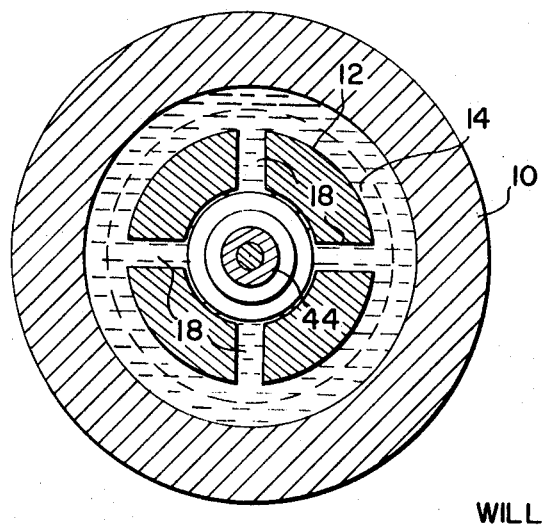
FIG. 2 is a cross-sectional view taken along the line 2—2 of FIG. 1.

Referring specifically to FIGS. 1 and 2 of the drawings which show the accelerometer of the present invention, the reference numeral 10 refers to an outer housing having a hollow portion extending through one end thereof, in which an inner housing 12 is disposed. The housings are rigidly and fixedly connected to one another at the upper ends thereof as viewed in FIGS. 1 and 3 and are spaced apart for most of their lengths to define an annular damping passage 14. A central cylindrical chamber 16 of a larger cross-sectional area than that of the damping passage 14 extends for the full length of the inner housing and communicates with the damping passage 14 through a plurality of radial passages 18, the latter being better shown in FIG. 2.

A seal 20 is disposed between the housings above the radial passages 18, and the upper portion of the inner wall of the outer housing is threaded as shown at 22 to accommodate a corresponding threaded flange 24 formed on the inner housing, so that the housings are axially adjustable with respect to each other. A fill tube 26 extends through the outer housing and communicates with the damping passage 14 for the introduction of a liquid metal, such as mercury, into the damping passage, and therefore into the cylindrical chamber 16 and the radial passages 18. A plug 28 is sealingly fitted in the upper portion of the cylindrical chamber 16 and is fixed at one end to a dial 30.

A capsule or proofmass assembly 32 is disposed in the chamber 16 and is better shown with a reference to FIG. 3. Specifically, the proofmass assembly 32 comprises a pair of discs 34 and 36 having flanges formed thereon which are of a diameter slightly less than the diameter of the inner wall of chamber 16. A hollow shaft 38 extends from one face of the disc 34 and receives a shaft 40 extending from the corresponding face of the disc 36. A spring 42 extends around the shafts and between the two discs. A latch magnet 44 (FIG. 1) is adapted to magnetically engage the disc 34 and is integral with a threaded shaft 46 which is threaded in a central bore formed in the plug 28.

A pair of insulated contact members 48 and 52 are provided, each of which extend through a portion of the inner housing and each having one end extending outwardly therefrom. The other end of the contact member 48 extends within the proofmass assembly 32, and the other end of the contact member 52 extends into the liquid metal in a radial passage 18.

A fill tube 50 extends around the contact member 48 and registers with the space between the discs 34 and 36 to permit a fluid of a lower density than the liquid metal such as in inert gas, to be introduced into this space. The fill tube also functions to electrically insulate the contact 48 from the remainder of the apparatus.

In operation, the accelerometer is mounted to the vehicle, or the like, to be accelerated and a predetermined amount of liquid metal, such as mercury, is introduced into the passages 14 and 18, as well as into the chamber 16, through the fill tube 26. A predetermined amount of inert gas, or the like, is introduced into the space between the discs 34 and 36 through the fill tube 50, and the action of the spring 42 maintains the pressure of the liquid metal greater than that of the inert gas, while preventing collapse of the proofmass assembly. However, in the event of changes in the ambient temperature particularly with respect to an increase thereof, the liquid metal will expand and slight compression of the assembly 32 will occur. If on the other hand, the disc members 34 and 36 were merely joined together by a rigid member or coupling rather than the spring and telescoping plunger arrangement preferred and disclosed herein, the increase in density of the liquid metal due to an ambient temperature increase would tend to exceed the surface tension adhesive force of the latter and cause liquid mercury to escape into the cavity between disc members 34 and 36. Thus, it will be appreciated that the spring and plunger construction described above will automatically compensate for changes in density of the liquid metal due to changes in ambient temperature so as to prevent leakage of the liquid metal into the proofmass assembly 32 and in addition, will relieve thermally induced stresses developed in the accelerometer housing by temperature expansion of the working liquids therein.

Upon the vehicle being subjected to an acceleration in the direction shown by the arrow in FIGS. 1 and 3, the proofmass assembly will translate relative to the housings in the same direction, after the bias acceleration provided by the latch magnet 44 is exceeded, the translation being damped due to the flow of liquid metal through the passage 14 of a reduced cross-sectional area. It is noted that translation in the direction of acceleration is possible due to the fact that the weight of the liquid metal disposed in the annular passage 14 exceeds that disposed in the portion of the chamber 16 immediately below the proofmass assembly 32 as shown in FIG. 1, due to the volume of the passage 14 being greater than that of said portion of the chamber 16.

Upon a predetermined amount of time integral of acceleration being attained, and hence a corresponding translation of the proofmass assembly 32, the flanged portion of disc 34 contacts the end of the contact member 48 extending within the proofmass assembly, as shown in FIG. 3, to provide continuity between the contact members 48 and 52 through the liquid metal, to provide an output signal. It can easily be demonstrated that the displacement of the proofmass assembly 32 within the inner housing 12 in the presence of an acceleration when damped by the resistance to the flow of liquid mercury through passage 14 as hereinaforesaid, is directly proportional to the time integral of the applied acceleration which, in turn, is equal to the instantaneous velocity of the housing 10. Thus, the output signal resulting from the engagement between contacts 52 and 48 will constitute the electrical analog of a predetermined velocity magnitude. By way of example, the accelerometer of the present invention may be most advantageously used aboard an airborne vehicle such as a guided missile to indicate when the missile has reached a predetermined velocity in its flight profile. This signal may then be used to control the guidance equipment aboard the vehicle in any well-known or convenient manner.

Since the shaft 46 is threaded inside the plug 28, a rotation of the dial 30 will result in an axial movement of the latch magnet 44 and the proofmass assembly 32 relative to the inner housing, which varies the vehicle velocity required for contact of the disc 34 with the contact end of contact member 48.

The discs 34 and 36 are designed so that the sum of their displaceable volumes in the liquid mercury is sufficient to provide a buoyancy force substantially equal to the acceleration of gravity times the mass of the proofmass assembly 32. With this arrangement the proofmass assembly is floated under conditions of neutral buoyancy or equilibrium in all directions normal to or perpendicular to the sensitive axis of the assembly and accordingly is free to move either axially or longitudinally in relation to this axis. Since, the volumes of discs 34 and 36 are properly calculated with regard to the force necessary to overcome gravity, the buoyancy force so produced will substantially reduce all normal and friction forces between the proofmass assembly and the wall of the chamber 16 to zero.

It is noted that even though the pressure of the liquid metal is higher than that of the inner gas disposed between the discs 34 and 36, the liquid metal will not leak through the wall-disc clearance. This is due to the high surface tension of the liquid metal which results in the cohesive forces being much greater than the liquid metal-wall adhesive forces.

It is apparent that constant damping achieved by the liquid metal flowing through the annular damping passage 14 is critical to the accurate operation of this device. Therefore, it is important that damping be maintained constant despite changes in the viscosity of the liquid metal due to changes in temperature. To begin with the temperature sensitivity of a liquid metal, such as mercury, is very low compared to that of, say, a conventional silicon-based damping fluid. However compensation for even slight changes in its viscosity due to changes in temperature may be easily achieved in the above arrangement by making the material of the inner housing of a higher expansion coefficient than that of the outer housing, so that the cross-sectional area of the damping passage 14 will decrease with increasing temperature, and vice versa. This plus the fact that the effective length of the proofmass assembly will also decrease in response to an increase in temperature, due to the expansion of the liquid metal, and vice versa, as pointed out above will substantially compensate for the change in the liquid metal viscosity caused by the change in temperature, and thereby maintain a substantially constant damping. In fact, it has been discovered that, with the above arrangement, the variation from constant damping is approximately 1.4 percent over a 100°C. temperature range.

Thus, the accelerometer of the present invention may be calibrated very accurately to permit the above constant damping to be achieved, by adjusting the relative axial position between the inner and outer housings, which varies the cross-sectional area of the damping passage 14, and by varying the volume of the fluids introduced into the device through the fill tubes 26 and 50.

In the event it is desired to decrease the above deviation from constant damping even more, the embodiment of FIG. 4 may be utilized. In this connection, a mathematic analysis of the factors involved in the damping can be expressed by the following known equation:

$$S = KR/\mu \quad (1)$$

Where $S$ = Translation rate sensitivity to acceleration
$R$ = Resistance of flow path
$\mu$ = Fluid viscosity
$K$ = A design constant From viscosity vs. temperature data, the following third-order polynomial can be determined:

$$\mu = \mu_o(1 + aT + bT^2 + cT^3) \quad (2)$$

Where $T$ = Temperature
$\mu$ = Viscosity
$\mu = \mu_o$ when $T = 0$

Also, flow resistance $R$ vs. temperature $T$ can also be described by a polynomial such as:

$$R = R_o(1 + AT + BT^2 + CT^3) \quad (3)$$

Where $R = R_o$ when $T = 0$

When equations (2) and (3) are substituted into equation (1), the following relationship is obtained:

$$S = K \frac{R_0}{\mu_0} \left[ \frac{1 + AT + BT^2 + CT^3}{1 + aT + bT^2 + cT^3} \right] \quad (4)$$

Since $K$, $R_o$ and $\mu_o$ are constants, the bracketed term must be kept constant as the temperature $T$ varies in order to maintain the sensitivity $S$, or damping, constant. This will be true if $A=a$, $B=b$, and $C=c$. Since the embodiment of FIGS. 1–3 has one damping passage 14, only one variable is possible, and the passage can be designed and varied to make $A=a$. The resulting error was due to $B \neq b$ and $C \neq c$ but since the second-order and third-order effects are small, the error was tolerable.

If it is desired to reduce the second-order error, the embodiment of FIG. 4 is designed to provide an additional variable, so that the condition $B=b$ can be achieved. In particular, the embodiment of FIG. 4 is similar to that of FIG. 1 with the exception of the fact that the hollow portion of the inner housing 10 is enlarged near its bottom portion to accommodate an intermediate section 60 so that an intermediate damping passage 62 is defined which is in communication with the damping passage 14. Since the inner and outer housings 10 and 12, along with the intermediate section 60 can all be made with a material having a different expansion coefficient, such as different types of glass, the change in the cross-sectional area of the damping passage 62 in response to temperature changes will be different from that of the damping passage 14, which therefore introduces an additional variable. For example, the material of the intermediate section may be selected so that the cross-sectional area of the damping passage 62 will increase with increasing temperature while the cross-sectional area of the damping passage 14 will decrease, as previously described.

As a result of the introduction of this additional variable, the variation from constant damping is reduced to merely third-order effects, due to $C \neq c$ in equation (4) above, which results in a variation of damping of less than 1 percent for mercury over a 100° C. temperature range.

Of course, still another variable may be introduced, such as by providing for another damping passage, in order to make $C=c$, and therefore eliminate the third-order effects.

It is thus seen that the accelerometer of the present invention is simple in construction and operation, and is extremely accurate. Also, provision is made for compensating for variations in temperature to maintain constant damping, along with calibration adjustments to allow the flow characteristics to be altered so that the temperature-compensating mechanism will maintain constant damping over the entire operating range.

Of course, other variations of the specific construction and arrangement of the accelerometer disclosed above can be made by those skilled in the art without departing from the invention as defined in the appended claims.

1. An accelerometer of the type capable of producing an output signal proportional to the time integral of the acceleration of its proofmass comprising:

an outer hollow housing member, an inner housing member having an interior bore and being disposed within said outer housing to provide an annular-shaped restricted clearance space between the outer wall of said inner housing and the inner wall of said outer housing, said clearance space communicating with the interior bore of said inner housing at either end thereof to define an endless passage, a proofmass assembly disposed within the interior bore of said inner housing for axial displacement therein in response to an applied acceleration, a dense liquid metal disposed in said endless passage and extending into the interior bore of said inner housing for surrounding said proofmass assembly, said proofmass assembly having a density less than that corresponding to said liquid metal whereupon axial displacement of said assembly in said inner member's interior bore causes said liquid metal to flow through said restricted clearance space between said inner and outer housings, said flow being restricted by said clearance space to dampen the motion of said proofmass, and signal means responsive to a predetermined axial displacement of said proofmass assembly for producing an output signal, wherein said proofmass assembly comprises a pair of displaced piston elements axially displaceable within said bore, and means for resiliently coupling said piston elements together wherein the axial space between said piston elements may be decreased upon an increase in the density of said liquid metal acting on said piston elements and an inert gas disposed between said piston elements within said inner housing bore, said resilient coupling means normally maintaining said liquid metal at a pressure greater than said inert gas.

2. The apparatus of claim 1 wherein each of said piston elements includes a protruding portion extending into said liquid metal in opposite directions respectively, whereby the displaceable volume of said protruding portions is sufficient to provide a buoyant force equal to the mass of said proofmass assembly times the acceleration of gravity, said buoyant force acting perpendicular to the longitudinal direction of the axis of said inner housing bore.

3. The accelerometer of claim 2 wherein said outer housing includes a first electrical contact means extending into said outer housing and communicating with said endless passage and therefore said liquid metal, and second electrical contact means extending through said inner and outer housings and into the space between said piston elements occupied by said inert gas, said second contact means disposed within an insulating fill tube which latter serves the dual function of insulating said electrical contact means from the remainder of the apparatus and for providing an inlet means for said inert gas.

4. The apparatus of claim 3 wherein said inner housing is integrally connected to a radially extending flange portion at one end thereof, said flange portion having an axis of rotation and including means for threadedly engaging the inner wall of said outer hollow housing at one end thereof, wherein said annular clearance space is inclined at an angle to said axis, whereby the cross-sectional area of said annular clearance space may be varied by rotating said flange portion relative to said outer housing through said threaded engagement means.

5. The accelerometer of claim 4 wherein said flange portion includes a bore centrally disposed therein in substantially coaxial relation to the bore in said inner housing, plug means disposed within said central bore in sealing engagement therewith and adjustable latch means coupled to said plug means extending therefrom and in engagement with one of the protruding portions on one of said piston elements whereby said latch means may determine the initial position of said proofmass assembly.

6. The accelerometer of claim 5 wherein said latch means includes a magnet means coacting with said one protruding portion of said piston element whereby said proofmass assembly will be prevented from axial displacement within said bore of said inner housing until a predetermined acceleration force has been exceeded equal to the force applied by said magnetic means on said piston element protruding means.

7. The accelerometer of claim 1 including means for maintaining said damping constant despite changes in ambient temperature, wherein said last-mentioned means includes said inner housing being formed of a material having a first temperature coefficient of expansion and, said outer housing being formed of a dissimilar material with respect to said inner housing whereby said outer housing material has a coefficient of temperature expansion dissimilar to that associated with said inner housing material, and said last-mentioned means further includes a second inner housing member disposed adjacent said first-mentioned inner housing member but displaced therefrom and from the inner walls of said outer housing member to form a second restricted clearance space between its outer wall portion and the inner wall portion of said outer housing member, the second restrictive clearance space formed by said additional inner housing member communicating with said first-mentioned restricted clearance space, and said second inner housing being formed of a material dissimilar to either material corresponding to said first-mentioned inner housing member or said outer housing member whereby the temperature coefficient of expansion of the outer housing member is dissimilar to the temperature coefficient of expansion of either the first-mentioned or second-mentioned inner housing members respectively.

8. The accelerometer of claim 1 wherein each of said piston elements is of electrically conductive material and wherein said outer housing includes a first electrical contact means extending into said outer housing and communicating with said endless passage and therefore said liquid, and a second insulated electrical contact means extending through said inner and outer housings into the space between said piston elements occupied by said inert gas, whereby predetermined axial displacement of said proofmass assembly in said inner housing bore closes an electrical circuit through said first and second contact means.